US005172113A

United States Patent [19]

Hamer

[11] Patent Number: 5,172,113

[45] Date of Patent: Dec. 15, 1992

[54] SYSTEM AND METHOD FOR TRANSMITTING DATA IN AN OPTICAL TRAFFIC PREEMPTION SYSTEM

[75] Inventor: Steven M. Hamer, Willernie, Minn.

[73] Assignee: Minnesota Mining and Manufacturing Company, St. Paul, Minn.

[21] Appl. No.: 781,892

[22] Filed: Oct. 24, 1991

[51] Int. Cl.[5] .............................................. G08G 1/095

[52] U.S. Cl. .................................... 340/907; 340/902; 340/906; 359/142; 359/148

[58] Field of Search ............... 340/907, 902, 906, 904, 340/916, 942, 555, 556; 359/109, 142, 148, 154

[56] References Cited

U.S. PATENT DOCUMENTS

| | | | |
|---|---|---|---|
| 3,550,078 | 12/1970 | Long . | |
| 3,831,039 | 8/1974 | Henschel | 307/234 |
| 4,162,477 | 7/1979 | Munkberg . | |
| 4,230,992 | 10/1980 | Munkberg | 328/140 |
| 4,234,967 | 11/1980 | Henschel . | |
| 4,463,339 | 7/1984 | Frick et al. | 340/906 |
| 4,704,610 | 11/1987 | Smith et al. | 340/906 |
| 4,734,881 | 3/1988 | Klein et al. | 364/900 |
| 4,914,434 | 4/1990 | Morgan et al. | 340/906 |
| 4,970,439 | 11/1990 | Stopa et al. | 315/241 |
| 4,972,185 | 11/1990 | Stopa et al. . | |
| 4,992,790 | 2/1991 | Montgomery | 341/70 |
| 4,994,714 | 2/1991 | Hoekman et al. | 315/80 |
| 5,014,052 | 5/1991 | Obeck | 340/906 |

OTHER PUBLICATIONS

"Traffic Signal Control Equipment: State of the Art", Dec. 1990, U.S. Dept. of Commerce, NTIS.

*Primary Examiner*—Donnie L. Crosland

*Attorney, Agent, or Firm*—Gary L. Griswold; Walter N. Kirn; William B. Barte

[57] ABSTRACT

A method of optically transmitting data from an optical emitter to a detector mounted along a traffic route is used in an optical traffic preemption system. The method allows variable data to be transmitted in a stream of light pulses by interleaving data pulses between priority pulses. By allowing data to be transmitted in a stream of light pulses, an optical emitter constructed in accordance with the present invention transmits an optical signal that can include an identification code that uniquely identifies the emitter, an offset code that causes a phase selector to create a traffic signal offset, an operation code that causes traffic signal lights to assume at least one phase and a range setting code that causes a phase selector to set a threshold to which future optical transmissions will be compared. Phase selectors constructed in accordance with the present invention are provided with a discrimination algorithm which is able to track a plurality of optical transmissions with each detector channel. Optical emitters constructed in accordance with the present invention are provided with a coincidence avoidance mechanism which causes overlapping optical transmission from separate optical emitters to drift apart. The present invention provides an optical signal format that allows variable data to be transmitted, while maintaining compatibility with prior optical traffic preemption systems.

44 Claims, 8 Drawing Sheets

SYSTEM AND METHOD FOR TRANSMITTING DATA IN AN OPTICAL TRAFFIC PREEMPTION SYSTEM

BACKGROUND OF THE INVENTION

This invention relates to a system that allows traffic signals to be remotely controlled, and more specifically, a method of optically transmitting data from an optical emitter to a detector mounted near an intersection.

Traffic signals have long been used to regulate the flow of traffic at intersections. Generally, traffic signals have relied on timers or vehicle sensors to determine when to change the phase of traffic signal lights, thereby signaling alternating directions of traffic to stop, and others to proceed.

Emergency vehicles, such as police cars, fire trucks and ambulances, are generally permitted to cross an intersection against a traffic signal. Emergency vehicles have typically depended on horns, sirens and flashing lights to alert other drivers approaching the intersection that an emergency vehicle intends to cross the intersection. However, due to hearing impairment, air conditioning, audio systems and other distractions, often the driver of a vehicle approaching an intersection will not be aware of a warning being emitted by an approaching emergency vehicle. This can create a dangerous situation.

This problem was first successfully addressed in U.S. Pat. No. 3,550,078 (Long), which is assigned to the same assignee as the present application. The Long patent discloses an emergency vehicle with an optical emitter, a plurality of photocells mounted near an intersection with each photocell looking down an approach to the intersection, a plurality of amplifiers which produce a signal representative of the distance of the approaching emergency vehicle and a phase selector which processes the signal from the amplifiers and can issue a phase request to a traffic signal controller to preempt a normal traffic signal sequence and give priority to the approaching emergency vehicle.

The Long patent discloses that as an emergency vehicle approaches an intersection, it emits a preemption request comprised of a stream of light pulses occurring at a predetermined repetition rate, such as 10 pulses per second, and with each pulse having a duration of several microseconds. A photocell, which is part of a detector channel, receives the stream of light pulses emitted by the approaching emergency vehicle. An output of the detector channel is processed by the phase selector, which then issues a phase request to a traffic signal controller to change to or hold green the traffic signal light that controls the emergency vehicle's approach to the intersection.

While the system disclosed by Long proved to be a commercial success, it became apparent that the system would have to be provided with better signal discrimination. The system disclosed by Long occasionally suffered false detections that occurred in response to low repetition rate light sources, fluorescent lights, neon signs, mercury vapor lamps and lightning flashes. It was also found that the system did not adequately discriminate between a series of equally spaced light pulses and a series of irregularly spaced light pulses. In addition, the length of time that the pulse request signal remained active after the termination of light pulses was unpredictable and sometimes too short.

U.S. Pat. No. 3,831,039 (Henschel), which is assigned to the same assignee as the present application, improved on the system disclosed in the Long patent by disclosing a more accurate discrimination circuit that imposed stricter requirements on the stream of light pulses received from an emergency vehicle. In the system disclosed by Henschel, the stream of light pulses must have proper pulse separation and continue for a predetermined period of time. Also, once a preemption request is issued to the traffic signal controller, the preemption request signal must remain active for at least a predetermined time period.

As an example, Henschel disclosed an embodiment where individual light pulses must not be separated by more than 120 milliseconds, the stream of light pulses must continue for at least 1.5 seconds and once activated, the phase request signal must remain active for at least 9 seconds. The discrimination circuit disclosed by Henschel provided an improvement over the discrimination circuit disclosed by Long and resulted in fewer incorrect detections.

Although the system originally disclosed by Long contemplated that optical traffic preemption systems would be used for emergency vehicles, such systems began to be used by authorized vehicles that were not emergency vehicles, such as buses and maintenance vehicles. Subsequently, a need arose to prioritize preemption requests originating from different classes of vehicles. For example, if a bus and an ambulance are each equipped with an optical emitter transmitting a preemption request and both are approaching an intersection simultaneously from different streets, the ambulance should be given priority to proceed through the intersection because a human life may be at stake. This need was addressed by U.S. Pat. No. 4,162,477 (Munkberg) which is assigned to the same assignee as the present application.

Munkberg disclosed an optical traffic preemption system wherein vehicles can transmit preemption requests at different priority levels. The optical emitter disclosed by Munkberg can transmit light pulses at a variety of selectable predetermined repetition rates, with the selected repetition rate indicative of a priority level. The discrimination circuit disclosed by Munkberg can discriminate between different classes of vehicles and assign each class a priority level. Systems constructed in accordance with the Munkberg patent have typically defined two priority levels; a low priority level that transmits approximately 10 light pulses per second and a high priority level that transmits approximately 14 light pulses per second.

The discrimination circuit disclosed by Munkberg employs a delay circuit controlled by a timing pulse generator. One discrimination circuit is required for each discrete repetition rate to be detected. A signal derived from detected light pulses is provided to the delay circuit and is delayed for a time interval equal to the period of the repetition rate to be detected. A delayed signal from the delay circuit is compared with the signal provided to the delay circuit. If the two signals have simultaneous pulses, the detected light pulses can be considered to have originated from a valid optical traffic preemption system emitter.

The discrimination circuit disclosed by Munkberg adequately discriminated between preemption priority levels. However, the system required a large number of discrete and dedicated circuits. U.S. Pat. No. 4,734,881 (Klein et al.) disclosed a discrimination circuit based on a microprocessor. The microprocessor used a windowing algorithm to validate that pulses of light had been transmitted from a valid optical traffic preemption system emitter.

In an embodiment disclosed by Klein et al., an optical traffic preemption system has four detector channels connected to input/output circuitry. The input/output circuitry is in turn connected to the microprocessor. Upon receiving a "first" light pulse at a detector channel, the microprocessor enters a lockout interval. During the lockout interval, no light pulse will be recognized at any detector channel. After the lockout interval expires, a window interval is entered which allows the detector channel that initially detected the first light pulse to receive an additional light pulse. The window interval is very brief and is centered around the point in time at which a light pulse from a valid emitter would be expected. If a pulse is detected during the window interval, the light pulses can be considered to have originated from a valid emitter. The lockout interval and the window interval are successively repeated as the discrimination circuit receives and tracks valid light pulses. However, if no pulse is received during a window interval, the discrimination circuit is reset and all detector channels are again able to detect a "first" light pulse.

SUMMARY OF THE INVENTION

The present invention provides a system and method for optically transmitting data from an optical emitter to a detector mounted near an intersection. In a first embodiment, the present invention employs a method wherein a stream of light pulses having priority pulses occurring at a repetition rate and data pulses interleaved with the priority pulses is used to transmit variable data. In this embodiment, the stream of light pulses are received, priority pulses and data pulses are sorted from one another and data derived from the priority pulses and the data pulses is assembled.

In a second embodiment, an optical emitter transmits a stream of light pulses which represents a transmitted signal that includes a preemption request and an identification code. The identification code uniquely identifies the optical emitter.

In a third embodiment, an optical emitter transmits a stream of light pulses which represents a transmitted signal that includes an offset code. In this embodiment, a phase selector responds to an offset code by alternately issuing phase requests to and withdrawing phase requests from a traffic signal controller based upon the offset code and the number of the channel which received the stream of light pulses.

In a fourth embodiment, an optical emitter transmits a stream of light pulses which represents a transmitted signal that includes an operation code. In response to the operation code, the phase selector issues a phase request to assume one or more phases based upon the operation code and irrespective of the detector that received the stream of light pulses.

In a fifth embodiment, an optical emitter transmits a stream of light pulses which represents a transmitted signal that includes a range setting code. A phase selector responds to the range setting code by determining an amplitude of the signal having the range setting code and using the amplitude as a threshold to which future received signals will be compared. Future received signals having an amplitude exceeding the threshold will be acted upon and future received signal having an amplitude less than the threshold, and not including the range setting code, will not be acted upon.

DETAILED DESCRIPTION OF THE PREFERRED EMBODIMENTS

Figure 1:
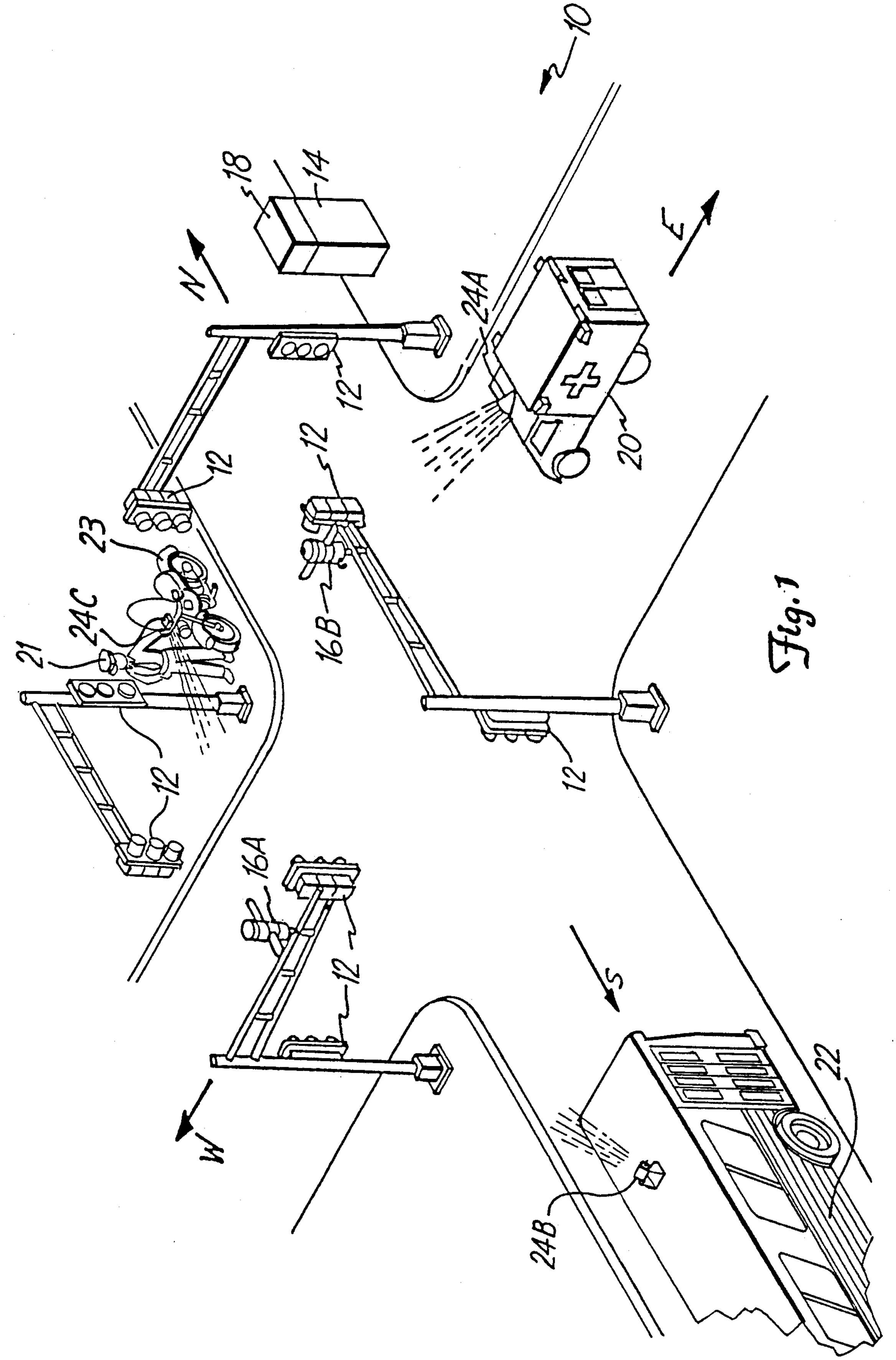
FIG. 1 is a perspective view of a bus and an ambulance approaching a typical traffic intersection, with the bus, the ambulance and an emitter mounted to a motorcycle each transmitting an optical signal in accordance with the present invention.

FIG. 1 is an illustration of a typical intersection 10 having traffic signal lights 12. A traffic signal controller 14 sequences the traffic signal lights 12 to allow traffic to proceed alternately through the intersection 10. Of particular relevance to the present invention, the intersection 10 is equipped with an optical traffic preemption system such as the Opticom™ Priority Control System manufactured by the Minnesota Mining and Manufacturing Company of Saint Paul, Minn.

The optical traffic preemption system shown in FIG. 1 includes detector assemblies 16A and 16B, optical emitters 24A, 24B and 24C and a phase selector 18. The detector assemblies 16A and 16B are stationed to detect light pulses emitted by authorized vehicles approaching the intersection 10. The detector assemblies 16A and 16B communicate with the phase selector 18, which is typically located in the same cabinet as the traffic controller 14.

In FIG. 1, an ambulance 20 and a bus 22 are approaching the intersection 10. The optical emitter 24A is mounted on the ambulance 20 and the optical emitter 24B is mounted on the bus 22. The optical emitters 24A and 24B each transmit a stream of light pulses at a predetermined repetition rate. Each light pulse has a duration of several microseconds. The detector assemblies 16A and 16B receive these light pulses and send an output signal to the phase selector 18. The phase selector 18 processes the output signal from the detector assemblies 16A and 16B and issues a phase request to the traffic signal controller 14 to preempt a normal traffic signal sequence.

FIG. 1 also shows an authorized person 21 operating a portable optical emitter 24C, which is there shown mounted to a motorcycle 23. In one embodiment, the emitter 24C is used to set the detection range of the optical traffic preemption system. In another embodiment, the emitter 24C is used by the person 21 to affect the traffic signal lights 12 in situations that require manual control of the intersection 10.

U.S. Pat. No. 4,162,477 (Munkberg), which is assigned to the same assignee as the present application, discloses a multiple priority optical traffic preemption system that utilizes the predetermined repetition rate of the optical emitter to indicate a preemption priority level. If the optical traffic preemption system of FIG. 1 were constructed in accordance with the Munkberg patent, the ambulance 20 would be given priority over the bus 22 because a human life may be at stake. Accordingly, the ambulance 20 would transmit a preemption request with a predetermined repetition rate indicative of a high priority, such as 14 pulses per second, while the bus 20 would transmit a preemption request with a predetermined repetition rate indicative of a low priority, such as 10 pulses per second. The phase selector would discriminate between the low and high priority signals and request the traffic signal controller 14 to cause the traffic signal lights 12 controlling the ambulance's approach to the intersection to remain or become green and the traffic signal lights 12 controlling the bus's approach to the intersection to remain or become red.

Prior Opticom TM systems have employed two tiers of signal discrimination. The first tier simply identified whether the stream of light pulses was being emitted from a valid Opticom TM emitter. This was disclosed in U.S. Pat. No. 3,550,078 (Long) and U.S. Pat. No. 3,831.039 (Henschel), which are both assigned to the same assignee as the present application. The second tier of signal discrimination, as disclosed by Munkberg, provided the ability to encode multiple priority levels in the Opticom TM signal by employing predetermined pulse stream repetition rates that are indicative of priority levels. This invention adds a third tier of signal discrimination, the ability to encode and discriminate variable data in the stream of light pulses.

By encoding variable data into the stream of light pulses, a plethora of new optical traffic preemption system options become possible. In one embodiment, optical emitters constructed in accordance with the present invention transmit an identification code that uniquely identifies the optical emitter. In one configuration of this embodiment, the identification is divided into a user code and a vehicle classification code. For example, in this configuration, bus 22 of FIG. 1 transmits a vehicle classification code that identifies the bus 22 as a mass transit vehicle and a user code that distinguishes the bus 22 from other vehicles sharing the same vehicle classification code. Likewise, the ambulance 20 transmits a vehicle classification code that identifies the ambulance 20 as an emergency vehicle and a user code that identifies the individual ambulance. In other configurations, the user can define the identification code to represent authorized vehicles in any manner the user desires.

Phase selectors constructed in accordance with the present invention can be configured to use an identification code in various ways. In one configuration, the phase selector 18 is provided with a list of authorized identification codes. In this configuration, the phase selector 18 confirms that the vehicle is indeed authorized to preempt the normal traffic signal sequence. If the transmitted code does not match one of the authorized codes on the list, preemption does not occur. This configuration is especially useful in preventing unauthorized users from preempting the normal traffic control sequence.

In another configuration, the phase selector 18 logs all preemption requests by recording the time of preemption, direction of preemption, duration of preemption, identification code and confirmation of passage of a requesting vehicle within a predetermined range of a detector. In this configuration, abuse of an optical traffic preemption system can be discovered by examining the logged information.

In another embodiment of the present invention, an optical traffic preemption system helps run a mass transit system more efficiently. An authorized mass transit vehicle having an optical emitter constructed in accordance with the present invention, such as the bus 22 in FIG. 1, spends less time waiting at traffic signals, thereby saving fuel and allowing the mass transit vehicle to serve a larger route. This also encourages people to utilize mass transportation instead of private automobiles because authorized mass transit vehicles move through congested urban areas faster than other vehicles.

Unlike an emergency vehicle, a mass transit vehicle equipped with an optical emitter may not require total preemption. In one embodiment, a traffic signal offset is used to give preference to a mass transit vehicle, while still allowing all approaches to the intersection to be serviced. For example, a traffic signal controller that normally allows traffic to flow 50 percent of the time in each direction responds to repeated phase requests from the phase selector to allow traffic flowing in the direction of the mass transit vehicle to proceed 65 percent of the time and traffic flowing in the other direction to flow 35 percent of the time. In this embodiment, the actual offset is fixed to allow the mass transit vehicle to have a predictable advantage.

In another embodiment, the offset is variable. A variable offset allows a mass transit vehicle to remain on schedule. In this embodiment, a late mass transit vehicle is granted an offset, with the magnitude of the offset proportional to the extent to which the mass transit vehicle is behind schedule. An on-time or early mass transit vehicle is not granted an offset. By basing the magnitude of the offset on the lateness of a mass transit vehicle, the mass transit vehicle tends to remain on schedule.

In one embodiment, the offset is selected manually by the mass transit vehicle operator by using a keypad, joystick, toggle switch, or other input device which is coupled to the emitter. In this embodiment the magnitude of the offset is encoded in the optical signal. In another embodiment, the offset is determined automatically in conjunction with a system that determines whether the mass transit vehicle is on schedule. Such a system could be located on the mass transit vehicle, in which case the magnitude of the offset is encoded in the optical signal, or it could be housed in the same cabinet as the traffic signal controller, in which case the system only requires that the vehicle identification code be transmitted in the optical signal.

An Opticom TM system does not actually control a traffic intersection. Rather, the phase selector alternately issues phase requests to and withdraws phase requests from the traffic signal controller, and the traffic signal controller determines whether the phase requests can be granted. The traffic signal controller may also receive phase requests originating from other sources, such as a nearby railroad crossing, in which case the traffic signal controller may determine that the phase request from the other source be granted before the phase request from an Opticom TM phase selector. However, as a practical matter, an Opticom TM system can affect a traffic intersection and create a traffic signal offset by monitoring the traffic signal controller sequence and repeatedly issuing phase requests which will most likely be granted.

By utilizing this method, an Opticom TM system capable of transmitting variable data also provides a variety of new options for remotely controlling traffic signals. In one embodiment, an authorized person (such as person 21 in FIG. 1) can remotely control a traffic intersection during situations requiring manual traffic control, such as funerals, parades or athletic events, by using an Opticom TM emitter. In this embodiment the emitter has a keypad, joystick, toggle switch or other input device which the authorized person uses to select traffic signal phases. The emitter, in response to the information entered through the input device, transmits a stream of light pulses which include an operation code representing the selected traffic signal phases. In response to the operation code, the phase selector will issue phase requests to the traffic signal controller, which will probably assume the desired phases.

In another embodiment, an Opticom TM emitter capable of transmitting variable data is used by field maintenance workers to set Opticom TM parameters, such as the effective range of an Opticom TM system. The range of prior Opticom TM systems was set by placing an operating Opticom TM emitter at the desired range and adjusting potentiometers associated with the phase selector until the system was on the threshold of recognizing the stream light pulses. However, in this embodiment, a maintenance worker simply positions an Opticom TM emitter at the desired range and transmits a range setting code. The phase selector then determines the amplitude of the optical signal and uses this amplitude as a threshold for future Opticom TM transmissions, except transmissions having a range setting code.

Figure 2:
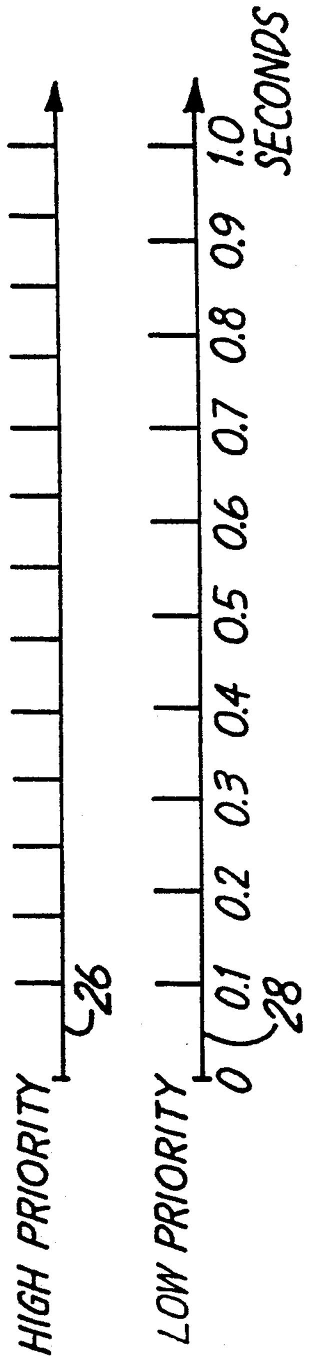
Fig. 2 (PRIOR ART)
FIG. 2 shows a low and a high priority optical traffic preemption system pulse stream of the prior art.

FIG. 2 shows two prior Opticom TM pulse streams in accordance with the format disclosed by Munkberg. An Opticom TM pulse stream is controlled by an extremely accurate crystal oscillator. Timing between pulses is critical in identifying the signal as having originated from an Opticom TM emitter. A high priority pulse stream 26 is a stream of equally spaced pulses occurring at a repetition rate of approximately 14 pulses per second. A low priority pulse stream 28 is a stream of pulses occurring at a repetition rate of approximately 10 pulses per second.

The data transmission scheme of the present invention functions identically in a high priority and a low priority signal For illustrative purposes, the data transmission scheme will be described with reference to a low priority signal having a repetition rate of 10 pulses per second.

Figure 3:
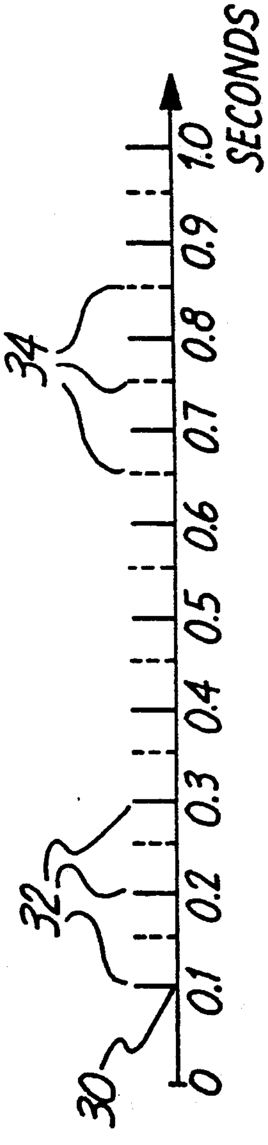
FIG. 3 shows an optical traffic preemption system pulse stream in accordance with the present invention.

FIG. 3 shows a segment of a pulse stream 30 in accordance with the present invention. Pulses 32 are required to indicate that an optical transmission originates from an Opticom TM emitter. Because pulses 32 indicate a priority and are required to make the present invention compatible with prior Opticom TM Priority Control Systems, henceforth pulses 32 will be referred to as priority pulses.

Data pulse slots 34 represent positions where data pulses can be interleaved with priority pulses. Each data pulse slot is evenly spaced between a pair of priority pulses. The presence of a data pulse in a data pulse slot represents a first logic state and the absence of a data pulse in a data pulse slot represents a second logic state. In other embodiments, several data pulse slots 34 can be positioned between each consecutive pair of priority pulses 32, thereby increasing the data transmission capacity of the signal format while maintaining compatibility with prior Opticom TM systems.

Prior Opticom TM systems, as disclosed by Munkberg and Klein et al., expect pulses to occur at precise predetermined repetition rates. Because light pulses can also originate from other sources, prior Opticom TM systems were designed to ignore additional pulses in the pulse stream.

Although a prior Opticom TM phase selector will not be able to discern any variable data encoded in an Opticom TM transmission, it will be able to recognize the signal as an Opticom TM transmission. An Opticom TM signal having variable data, in accordance with the present invention, still contains precisely timed priority pulses indicative of an Opticom TM transmission, with a priority level indicated by the predetermined repetition rate of the pulses. Likewise, an Opticom TM phase selector constructed in accordance with the present invention will be able to receive and recognize a signal from a prior Opticom TM emitter, although that signal will not contain variable data.

A data transmission format is required for an optical emitter to transmit discernable information. In one embodiment of the present invention, a data transmission format is defined as a framing segment comprising i consecutive first or second logic states, a start segment defined as j consecutive first or second logic states and a data segment defined as k consecutive variable logic states, wherein each variable logic state is one of the first or second logic states.

In one embodiment, this data format is used to form a data packet having n data bits and requiring a total of $2n+1$ data slots. The framing segment is comprised of n second logic states, the start segment is comprised of a single first logic state and the data segment is comprised of n variable logic states, where the presence of a data pulse in a data slot represents the first logic state and the absence of a data pulse from a data slot represents the second logic state. This data packet format assures that at least one data pulse (the start pulse) is transmitted every $2n+1$ data slots. If a phase selector does not detect a data pulse after $2n+1$ data slots, then the phase selector can assume that data pulses will not be included in the optical signal. The framing segment, which is comprised of n second logic states, allows the phase selector to recognize the start segment and the data segment.

The value of n must be large enough to provide sufficient codes to implement all the options desired. In one embodiment, n is 17, which provides 131,072 data codes. In this embodiment, the data codes are divided into 100,000 definable user codes and 31,072 system codes. User codes can be defined to represent whatever the user wishes. In one configuration, the user codes are divided into 10 vehicle classes, with each class having 10,000 codes. System codes are used for performing system functions such as setting the range of an Opticom TM system with an Opticom TM emitter. In this embodiment, a single data packet may represent either a user code or a system code, but not both.

In another embodiment, the data packet is defined such that some of the data slots of the data segment are reserved for system codes while the remaining data slots of the data segment are reserved for user codes. In this embodiment, user and system information is sent with every data packet.

The discrimination algorithm employed by the present invention is different from the discrimination methods used in prior Opticom TM systems. The windowing algorithm disclosed by Klein et al. is only adequate for detecting and tracking one Opticom TM transmission per detector channel because the lockout period prevents the discrimination circuit from detecting pulses from other sources. However, if the present invention is to implement such features as identification code logging, it must be able to detect and track more than one Opticom TM transmission per channel.

Figure 4:
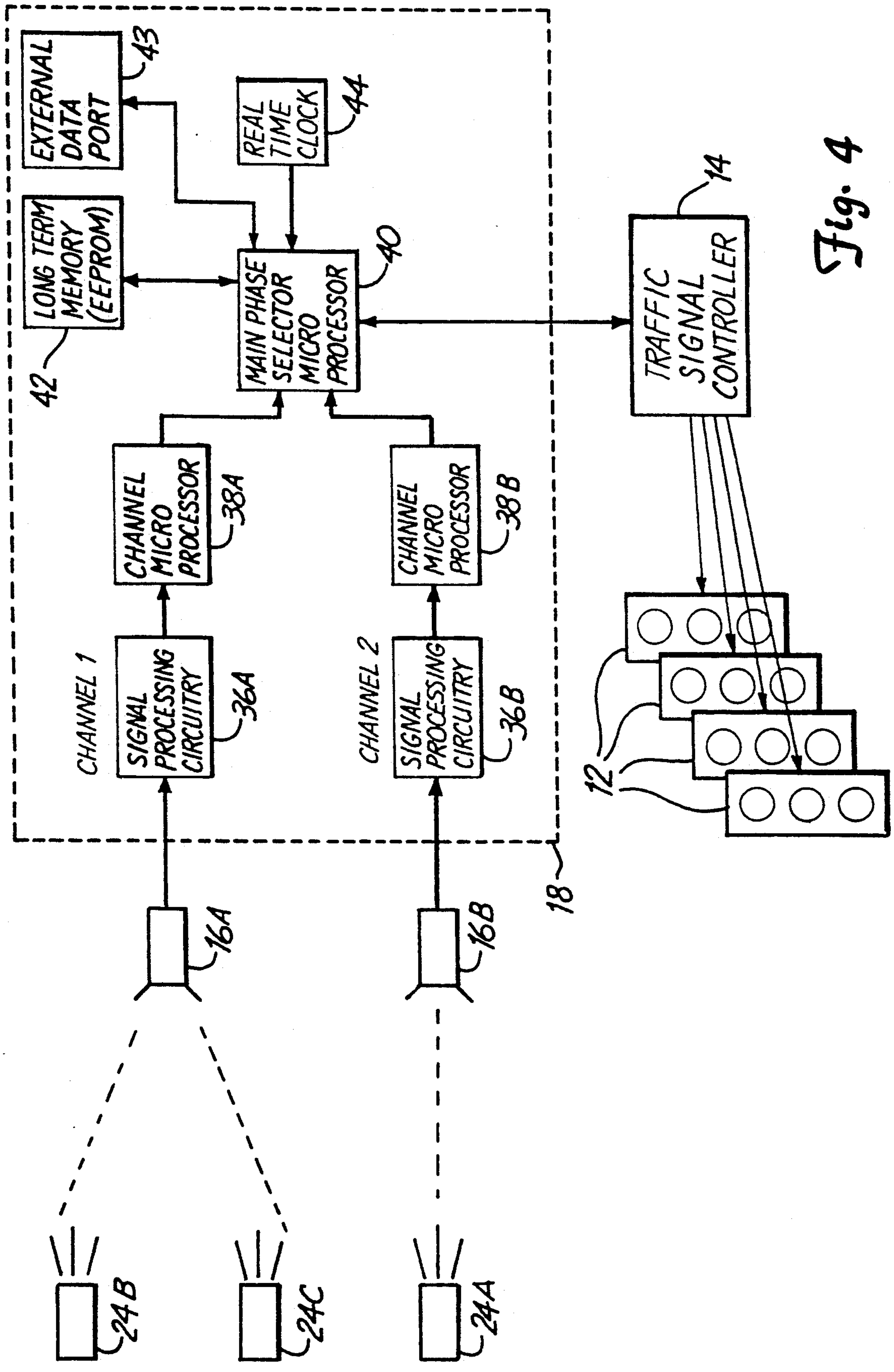
FIG. 4 is a block diagram of the components of the optical traffic preemption system shown in FIG. 1.

FIG. 4 is a block diagram showing the optical traffic preemption system of FIG. 1. In FIG. 4, light pulses originating from the optical emitters 24B and 24C are received by the detector assembly 16A, which is connected to a channel one of the phase selector 18. Light pulses originating from the optical emitter 24A are received by the detector assembly 16B, which is connected to a channel two of the phase selector 18.

The phase selector 18 includes the two channels, with each channel having signal processing circuitry (36A and 36B) and a channel microprocessor (38A and 38B), a main phase selector microprocessor 40, long term memory 42, an external data port 43 and a real time clock 44. The main phase selector microprocessor 40 communicates with the traffic signal controller 14, which in turn controls the traffic signal lights 12.

With reference to the channel one, the signal processing circuitry 36A receives an analog signal provided by the detector assembly 16A. The signal processing circuitry 36A processes the analog signal and produces a digital signal which is received by the channel microprocessor 38A. The channel microprocessor 38A extracts data from the digital signal and provides the data to the main phase selector microprocessor 40. Channel two is similarly configured, with the detector assembly 16B coupled to the signal processing circuitry 36B which in turn is coupled to the channel microprocessor 38B.

The long term memory 42 is implemented using electronically erasable programmable read only memory (EEPROM). The long term memory 42 is coupled to the main phase selector microprocessor 40 and is used to store a list of authorized identification codes and to log data.

The external data port 43 is used for coupling the phase selector 18 to a computer. In one embodiment, external data port 43 is an RS232 serial port. Typically, portable computers are used in the field for exchanging data with and configuring a phase selector. Logged data is removed from the phase selector 18 via the external data port 43 and a list of authorized identification codes is stored in the phase selector 18 via the external data port 43. The external data port 43 can also be accessed remotely using a modem, local-area network or other such device.

The real time clock 44 provides the main phase selector microprocessor 40 with the actual time. The real time clock 44 provides time stamps that can be logged to the long term memory 42 and is used for timing other events.

The present invention employs an algorithm which allows each detector channel to detect and track several Opticom TM transmissions simultaneously. In this embodiment, the algorithm is executed by each channel microprocessor (36A and 36B in FIG. 4). The major components of the algorithm, with respect to the channel microprocessor 38A of channel one, are shown as a block diagram in FIG. 5.

A module 46 gathers pulse information from the digital signal provided by the signal processing circuitry 36A of FIG. 4. If the module 46 receives pulse information, a module 48 stores a relative time stamp in a memory array. The relative time stamp serves as a record of a received pulse by indicating the time that the pulse was received relative to other received pulses. Whenever the module 48 stores a relative time stamp, a module 50 scans the memory array and compares the time stamp just stored with the time stamps that represent prior received pulses. If a prior received pulse is separated from the pulse just received by a predetermined interval, the pulse information is stored in a tracking array by a module 52.

In one embodiment, a low priority transmission has priority pulses occurring at a repetition rate of 9.639 Hz and a high priority transmission has priority pulses occurring at a repetition rate of 14.035 Hz. In this embodiment there are four possible predetermined time intervals separating valid Opticom TM pulses, a first interval of 0.07125 seconds separating sequential high priority Opticom TM priority pulses, a second interval of 0.03563 seconds separating a high priority Opticom TM priority pulse from an adjacent high priority Opticom TM data pulse, a third interval of 0.10375 seconds separating sequential low priority Opticom TM priority pulses and a fourth interval of 0.05187 seconds separating a low priority Opticom TM priority pulse from an adjacent low priority Opticom TM data pulse.

In other embodiments that have more than one data pulse slot between consecutive priority pulses, the predetermined intervals are fractions of the periods of the predetermined repetition rates. In an embodiment that defines a signal format having two data pulse slots spaced evenly between each consecutive pair of priority pulses, there are three predetermined intervals for each repetition rate. A first interval which is the period of the repetition rate, a second interval which is one-third the period of the repetition rate and a third interval which is two-thirds the period of the repetition rate.

The module 52 provides a preliminary detection indication to the main phase selector microprocessor 40 after it initially begins tracking a stream of light pulses originating from a common source. Thereafter, the module 52 provides assembled data packets and continuing detection indications to the main phase selector microprocessor 40. If the module 50 determines that none of the prior pulses are separated from the received pulse by a predetermined interval, control is returned to the module 46.

Figure 6:
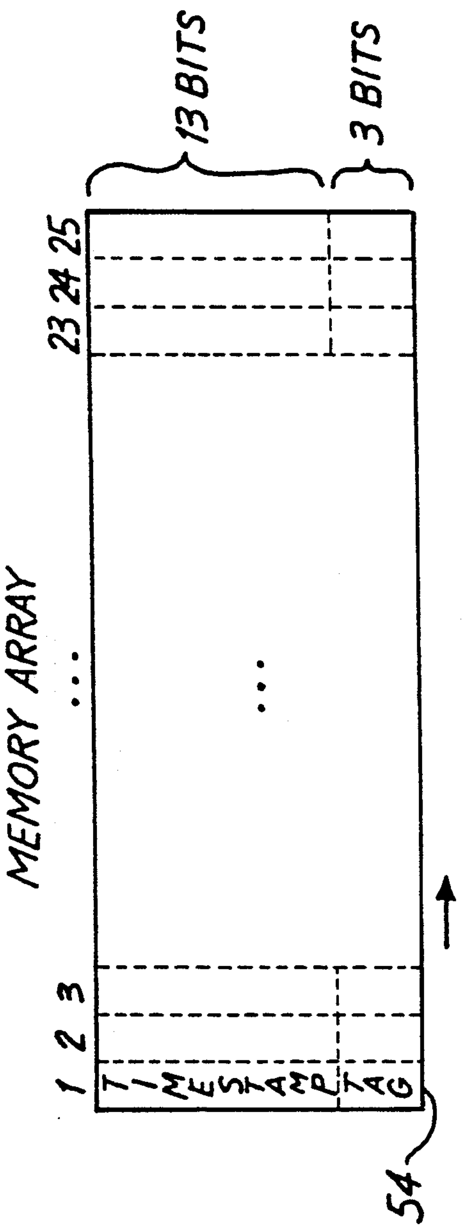
FIG. 6 is a block diagram of a memory array which stores pulse information and is utilized by the discrimination algorithm shown in FIG. 5.

FIG. 6 is a block diagram of a memory array 54, which is utilized by the modules 50 and 52. In this embodiment, the memory array 54 is a first-in first-out queue which is physically implemented as a circularly accessed memory array having 25 entries, with each entry capable of representing a single received pulse. The first entry contains information about the pulse just received. The remaining entries contain information about prior received pulses or are empty. The memory array 54 must have enough entries to represent two pulses from every Opticom TM source to be tracked, plus additional entries to store noise pulses from other sources. Pulses cannot be identified as noise until subsequent pulses have been received, so noise pulses must be stored.

Each entry of the memory array 54 is 16 bits wide. Three bits are reserved for a tag field and 13 bits are reserved for a relative time stamp. The tag field identifies pulses originating from a common Opticom TM emitter and is also used as an index that identifies a tracking array. The relative time stamp represents the time at which the pulse was received relative to prior received pulses. A relative time stamp having 13 bits can represent 8,192 separate points in time. Because the longest interval of interest is slightly greater than the largest Opticom TM time interval, the time stamp provides a resolution of approximately 13.33 microseconds.

Figure 7:
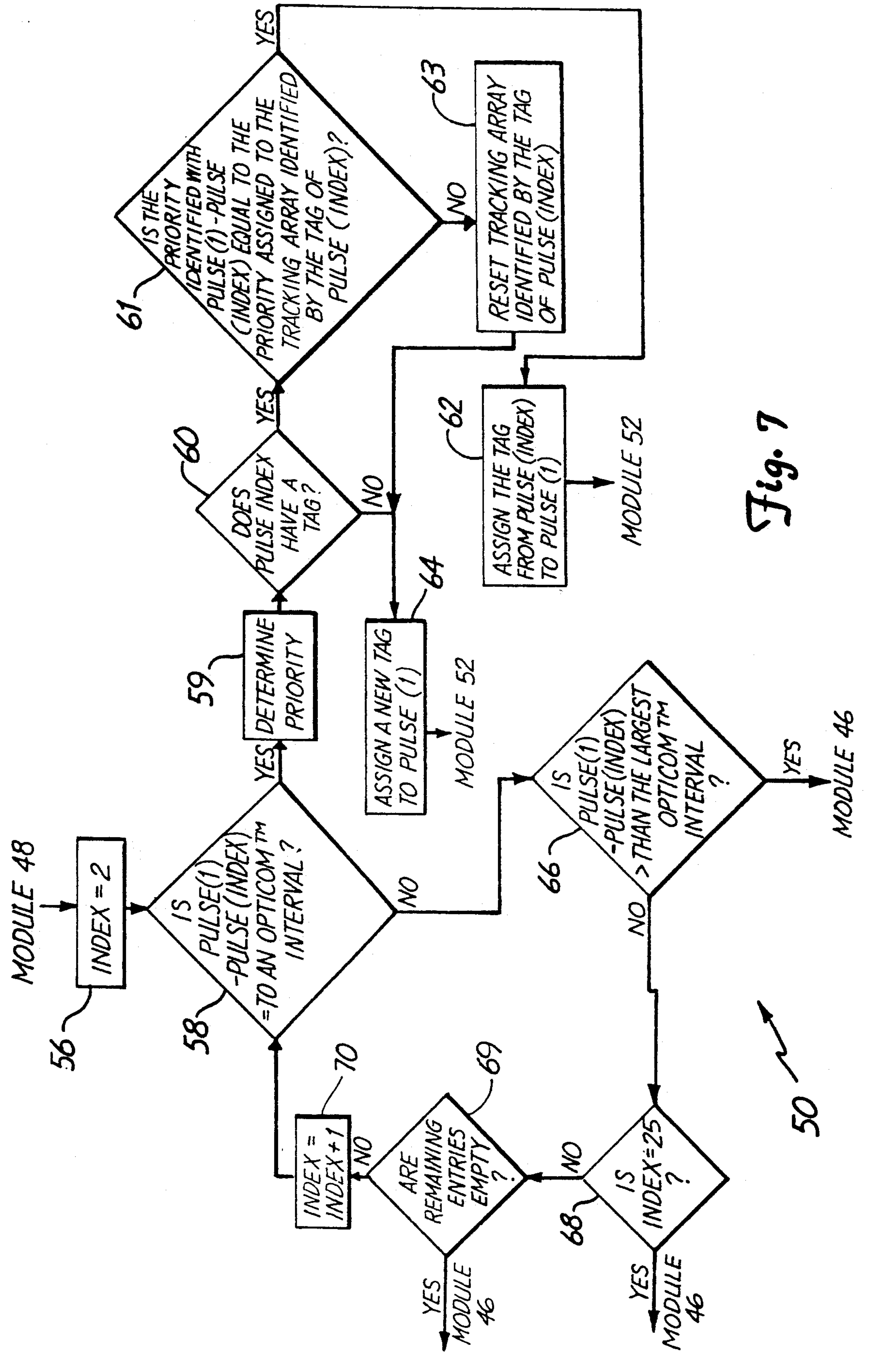
FIG. 7 is a flow chart of one of the algorithm modules shown in FIG. 5

FIG. 7 is a flow chart of the module 50. In a step 56, an index that references an entry of memory array 54 is initialized to two. A step 58 determines if the time interval separating the pulse just received (pulse(1)) from the pulse referenced by the index (pulse(index)) is equal to an Opticom TM time interval. In this embodiment, two pulses are considered to be separated by one of the Opticom TM time intervals if the magnitude of the difference between a time interval represented by pulse(1) and pulse(index) and one of the Opticom TM intervals is less than a window time interval. An optical traffic preemption system constructed in accordance with the present invention can have a window time interval as brief as 75 microseconds. However, to maintain compatibility with prior Opticom TM emitters, a larger window time interval of 350 microseconds is required.

A prior Opticom TM emitter does not emit data pulses. In one embodiment, this fact is used to separate prior Opticom TM emitters from optical emitters constructed in accordance with the present invention. In this embodiment, the window time interval is variable, with the step 58 using a smaller window time interval (as brief as 75 microseconds) to isolate light pulses originating from an emitter that is transmitting data pulses and a larger window time interval (such as 350 microseconds) to isolate light pulses originating from an emitter that is not transmitting data pulses.

In another embodiment, the window time interval is constant. In this embodiment, a larger window time interval (such as 350 microseconds) is used to simultaneously accommodate prior Opticom TM emitters and emitters constructed in accordance with the present invention. In another embodiment, a smaller window time interval (such as 75 microseconds) is used in situations where prior Opticom TM emitters are not utilized.

If the step 58 determines that the time interval separating pulse(1) from pulse(index) is equal to an Opticom TM time interval, a step 59 determines the priority represented by the Opticom TM time interval and a step 60 determines if pulse(index) has a tag. If pulse(index) has a tag, a step 61 determines if the priority determined in step 59 is the same as the priority assigned to the tracking array identified by the tag of pulse(index). If the priorities are the same, a step 62 assigns the tag of pulse(index) to pulse(1) and control is passed to the module 52. If the priorities are not the same, a step 63 resets the tracking array identified by the tag of pulse(index) and a step 64 assigns a new tag to pulse(1) and control is passed to the module 52. In the step 60, if pulse(index) does not have a tag, as would be the case if pulse(index) was the first pulse received from an emitter, the step 64 assigns a new tag to pulse(1) and control is passed to module 52.

In the step 58, if the time interval separating pulse(1) from pulse(index) is not equal to an Opticom TM time interval then three steps (66, 68 and 69) determine whether the memory array 54 in FIG. 6 has been completely processed. The step 66 determines whether the time interval separating pulse(1) from pulse(index) is larger than the largest Opticom TM time interval. If it is, control is returned to the module 46 and if it is not, the a step 68 determines if the index has reached 25, which in this embodiment represents the last entry in the memory array 54. If the index has reached 25, control returned to the module 46. If the index has not reached 25, a step 69 determines whether the remaining entries are empty. If they are empty, control is returned to the module 46. If they are not empty, the memory array has not been completely scanned and a step 70 increments the index by one and the step 58 is repeated.

The module 50 must have two pulses from the same Opticom TM emitter stored in the memory array 54 before it can identify an Opticom TM transmission. When a "first" pulse from an emitter is stored in the memory array 54, a time stamp is stored, but no tag can be assigned. A first pulse could be a noise pulse. When a "second" pulse is received and that pulse is separated from the first pulse by a time interval indicative of a pair of Opticom TM pulses, a tag is assigned to the second pulse and the module 50 sends information about the second pulse to the appropriate tracking array in the module 52. The appropriate tracking array is identified by the tag and the information sent includes a pulse indication, the Opticom TM time interval, which can be one of four values in this embodiment, and the amplitude of the pulse. If the module 50 identifies a third pulse having proper timing with the second pulse, the tag of the second pulse is copied to the tag field of the third pulse. By using this method, the module 50 is able to separate and track the received pulses based on the Opticom TM source from which each pulse originated.

Figure 5:
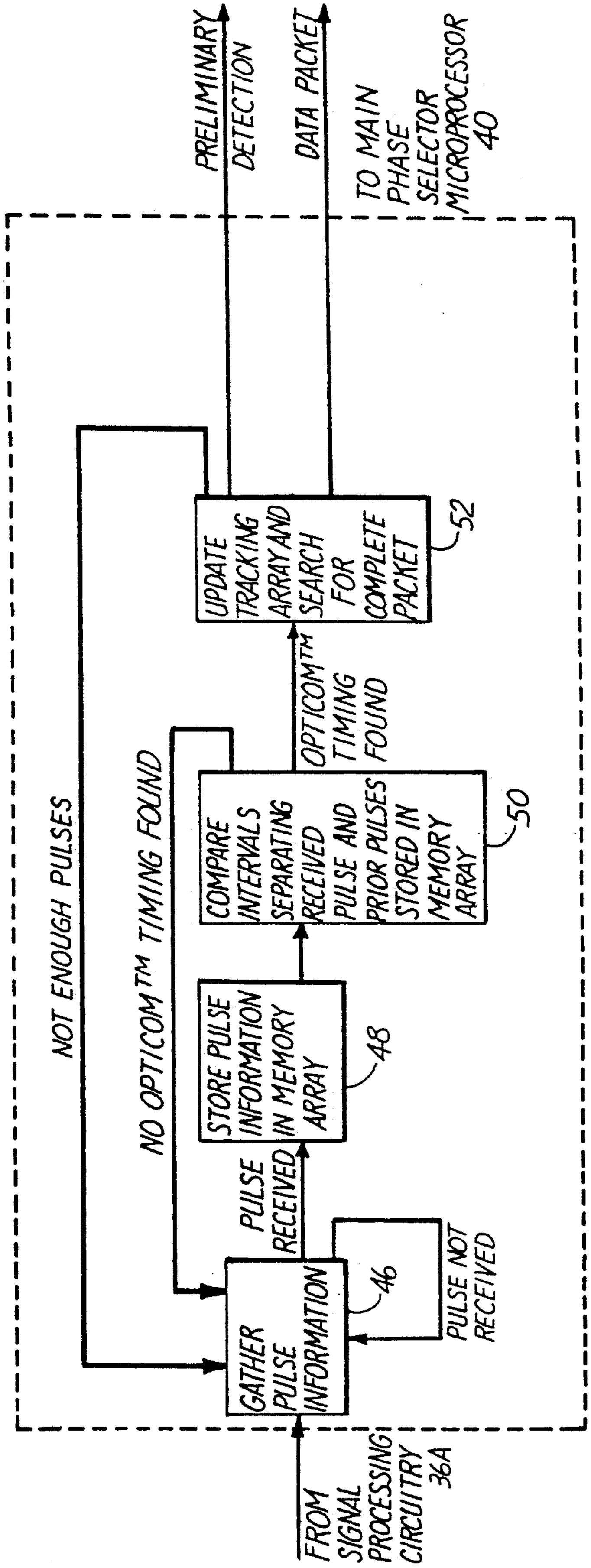
FIG. 5 is a block diagram representing the discrimination algorithm employed by the present invention.
Figure 8:
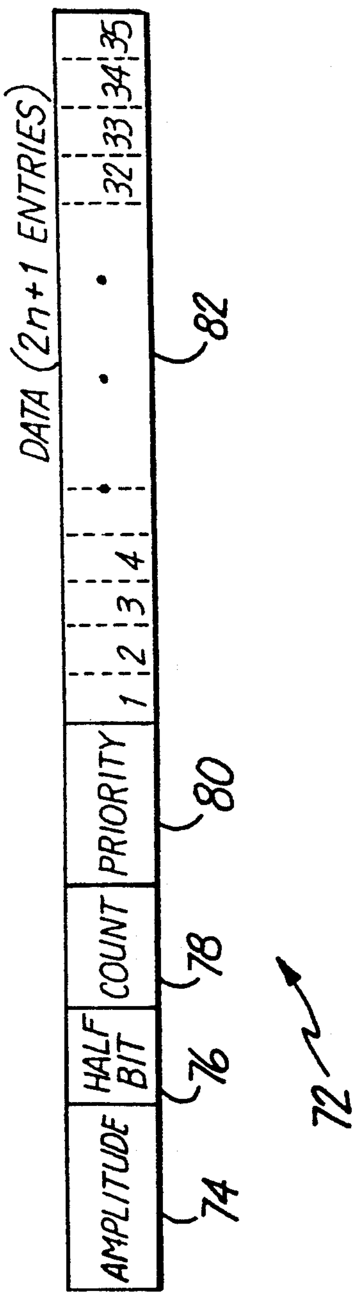
FIG. 8 is a tracking array, which is utilized by the discrimination algorithm in FIG. 5 to track pulses originating from a common source.

FIG. 8 is a block diagram of a tracking array 72 that is utilized by the module 52 of FIG. 5. One tracking array 72 is required for each Opticom TM emitter to be tracked. In this embodiment, there are four tracking arrays 72. Each tracking array 72 has several fields, an amplitude field 74 that maintains the amplitude of the last pulse received, a half-bit field 76 for sorting priority pulses from data pulses, a count field 78 that stores the number of priority pulses received, a priority field 80 that represents the priority of the optical transmission and a data field 82 that is used to assemble a data packet as it is received. The data field 82 is a one-bit wide, 35 bit deep first-in first-out queue that is physically implemented as a circularly accessed memory array. In other embodiments having different data packet sizes, data field 82 is 2n+1 bits deep, where n is the number of data bits transmitted in the data packet.

When the module 50 assigns a tag to the second pulse received from the same Opticom TM emitter, the priority of the transmission is established and is stored in the priority field 80. A one indicates low priority and a two indicates high priority. If the module 52 is tracking optical transmissions from four emitters and the module 50 detects a fifth emitter transmitting at a high priority, the module 50 will attempt to track the fifth emitter by dropping a low priority emitter from a tracking array 72. If all of the tracking arrays 72 are assigned to high priority emitters, the fifth emitter will be ignored. A priority field 80 with a value of zero indicates that the tracking array is available for assignment to an Opticom TM emitter.

Figure 9:
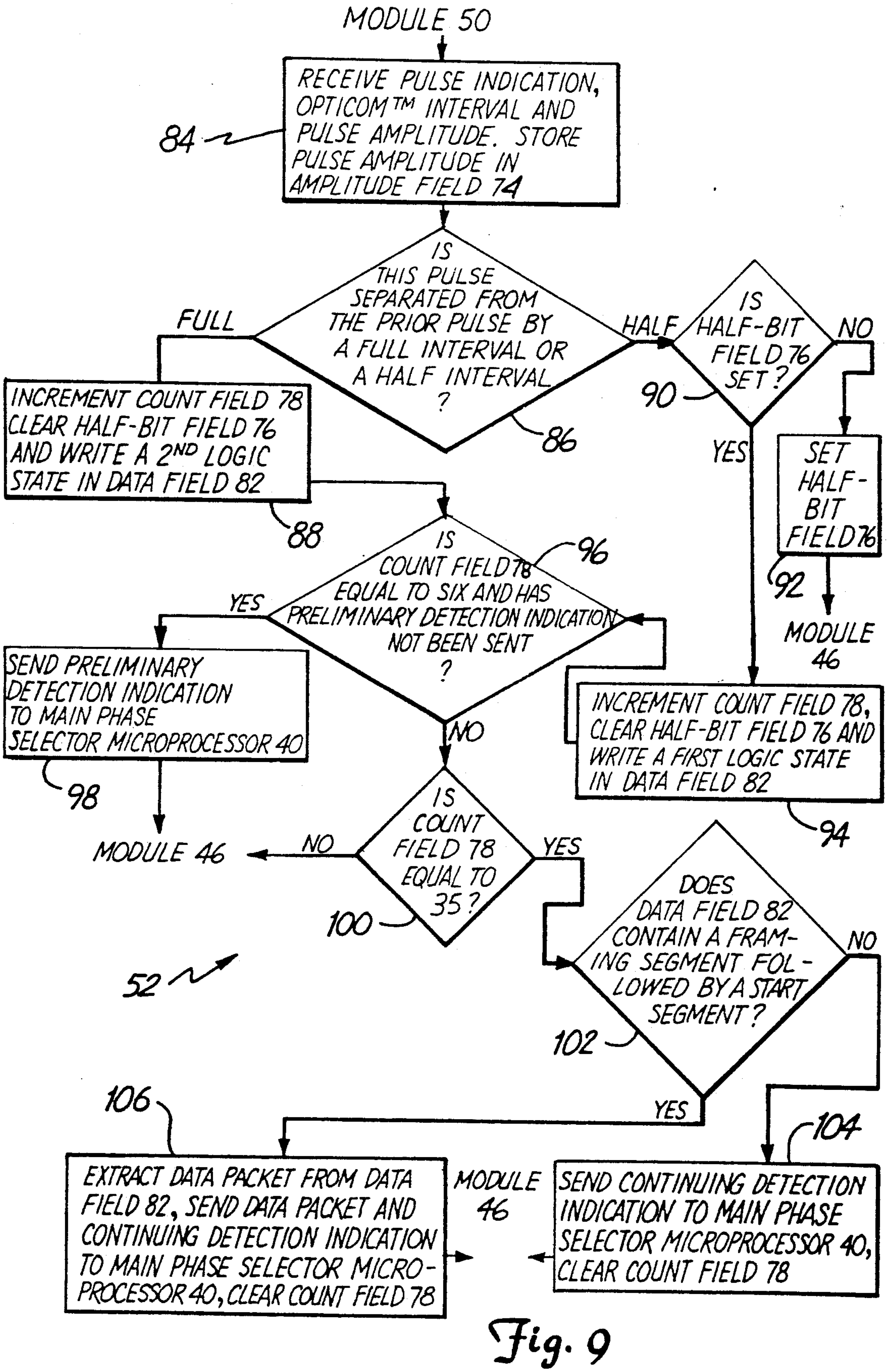
FIG. 9 is a flow chart of one of the algorithm modules shown in FIG. 5.

FIG. 9 is a flow chart of the module 52. A step 84 receives a pulse indication, an Opticom TM interval and a pulse amplitude and stores the pulse amplitude in the amplitude field 74. In this embodiment, the amplitude field 74 represents the amplitude of the last pulse received. In other embodiments, the amplitude of the last pulse received can be combined with the prior value stored in the amplitude field 74 to produce a weighted average of the last received pulse and prior received pulses.

A step 86 determines if the time interval between the received pulse and the previous received pulse is equal to the time interval between a pair priority pulses (a full pulse interval) or the time between a data pulse and a priority pulse (a half pulse interval). If the time interval is a full pulse interval, a step 88 increments the count field 78 by one, clears the half-bit field 76 and writes a second logic state in the data field 82.

If the step 86 determines that the time interval is a half-pulse interval then a step 90 examines the half-bit field 76. If the half-bit field 76 is clear, then a step 92 sets the half-bit field 76 and returns control to the module 46. However, if the half-bit field 76 is set, a step 94 increments the count field 78 by one, clears the half-bit field 76 and writes a first logic state in the data field 82.

After the steps 88 or 94 have written a logic state to the data field 82, a step 96 determines whether the count field is equal to six and whether a preliminary detection indication has not already been sent. If both these conditions are true, step 98 sends a preliminary detection indication to the main phase selector microprocessor 40 of FIG. 4. The preliminary detection indication includes the values stored in the amplitude field 74 and the priority field 80 and the channel number (one or two in FIG. 4) that is in the process of receiving the optical signal.

In this embodiment, it will take 35 priority pulses to detect and assemble a whole data packet, the presence of an Opticom TM signal can be established much sooner. The preliminary detection indication is important. With a high priority emitter having a repetition rate of approximately 14 pulses per second, it will take approximately 2.5 seconds to receive a complete data packet. The preliminary detection indication can be issued in less than one-half a second after detecting an Opticom TM transmission. If an Opticom TM system is used on a road where an emergency vehicle is likely approach an intersection at a high speed, the person responsible for configuring the system may wish to have the system began to preempt the traffic signal sequence before the phase selector can identify the vehicle's identification code. In this configuration, the Opticom TM system would preempt the traffic signal sequence based on the presence of an Opticom TM transmission, not on a processed confirmation of an authorized user. However, all users requesting preemption can still be logged and the system could be monitored for abuse. Of course in other embodiments, the preliminary detection indication can be issued after any number of priority pulses have been detected.

If the step 96 determines that the preliminary detection indication has been sent or the count field 78 is not equal to six, a step 100 determines whether the count field 78 is equal to 35, which is the number of priority pulses required to send a data packet. If the count field 78 is not equal to 35, control is returned to module 46.

If the count field 78 is equal to 35, a step 102 scans the data field 82 to determine if the data field 82 contains a framing segment followed by a start segment. If it does, a step 106 extracts a data packet from the data field 82 and sends the data packet and a continuing detection indication to the main phase selector microprocessor 40. The continuing detection indication includes the values stored in the amplitude field 74 and the priority field 80 and the channel number (one or two in FIG. 4) that is in the process of receiving the optical signal. The step 106 then clears count field 78 and returns control to the module 46.

If the data field 82 does not contain a framing segment followed by a start segment, a step 104 sends a continuing detection indication to the main phase selector microprocessor 40. However, because there is not any discernable data in the data field 82, the step 104 cannot send a data packet. The step 104 then clears the count field 78 and returns control to the module 46.

By looking for the framing segment anywhere in data field 82, step 106 will most likely combine part of a data segment from a previous data packet with part of a data segment from the data packet just received, thereby assuring that a data packet from an Opticom TM emitter can be received and assembled after 35 priority pulses. However, this embodiment also assumes that all data packets contain the same data. If an Opticom TM emitter were to transmit data packets having data segments that varied from packet to packet, the data could not be extracted using by using data segments from two separate data packets. The data could only be extracted when the framing segment reached the right end of the data field 82 in FIG. 8. At this point, the left end of the data field would contain a data segment from a single data packet.

Figure 10:
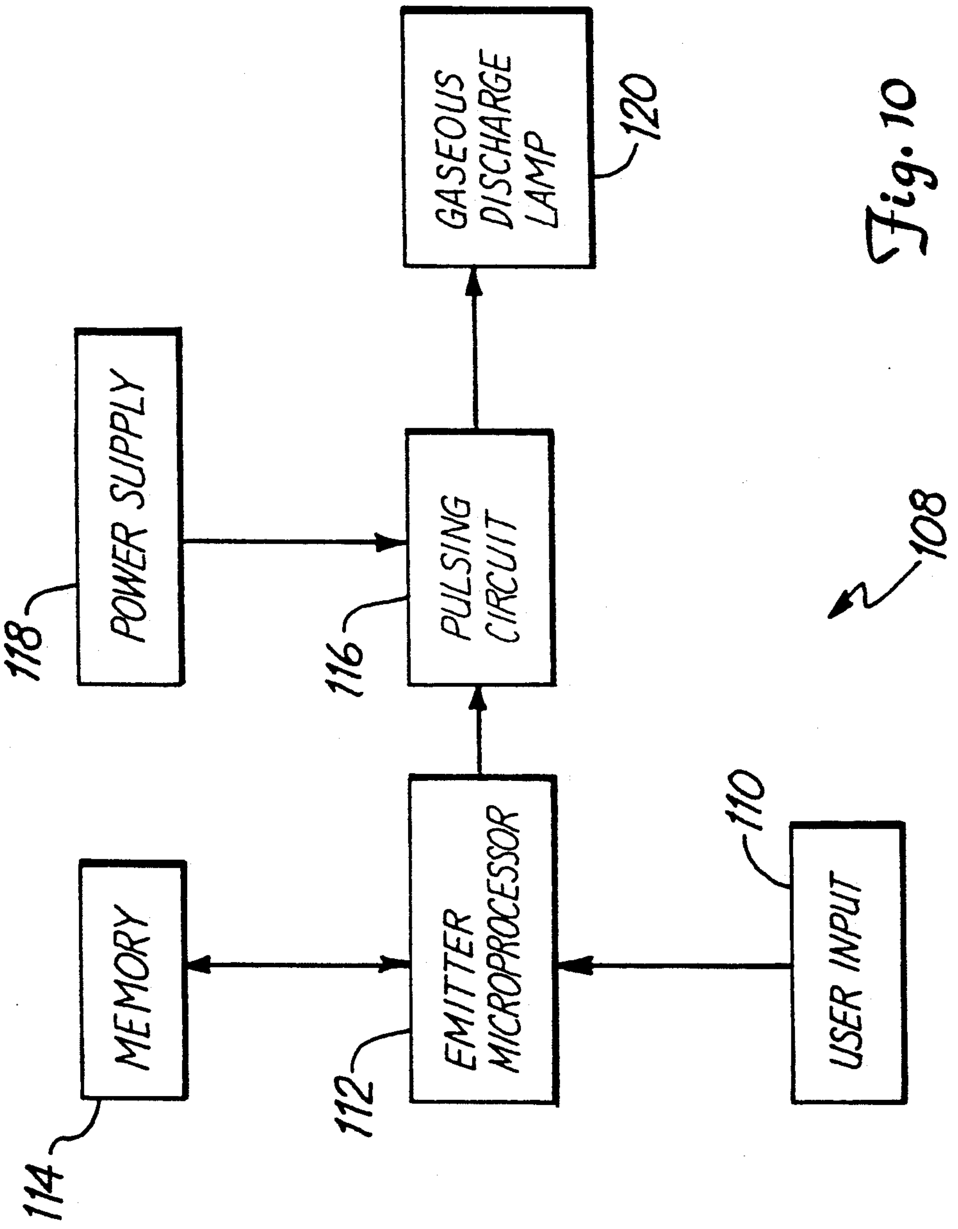
FIG. 10 is a block diagram of an optical emitter construct in accordance with the present invention.

FIG. 10 shows an optical emitter 108 constructed in accordance with the present invention. The emitter 108 is functionally equivalent to optical emitters 24A, 24B and 24C shown in FIGS. 1 and 4. The emitter 108 has user input 110, an emitter microprocessor 112, memory 114, a pulsing circuit 116, a power supply 118 and a gaseous discharge lamp 120.

The user input 110 allows the user to supply data which affects the optical signal transmitted by the lamp 120. In one embodiment, such as the emitter 24A attached to the ambulance 20 in FIG. 1, the user input 110 is comprised of a switch that determines the priority of the optical transmission and a set of BCD switches that are used to enter the identification code. In this embodiment, user input 110 is initially configured to identify the ambulance 20 and will not need to be changed unless the identification code of the ambulance 20 changes.

In another embodiment, such as the emitter 24C operated by authorized person 21 in FIG. 1, the user input is comprised of a device such as a keypad, joystick or toggle switch, that allows data to be entered easily and continuously. In this embodiment, the data provided by the user input 110 is continuously changing.

The memory 114 provides temporary storage and stores a program for the emitter microprocessor 112. The memory 112 is comprised of RAM and ROM. In one embodiment, the memory 112 is stored in the same integrated circuit as the emitter microprocessor 112.

The emitter microprocessor 112 executes a program stored in the memory 114. The program takes the data provided by the user input 110 and provides a timing signal to the pulsing circuit 116. The pulsing circuit 116 modulates a power signal provided by power supply 118 to cause the lamp 120 to transmit an optical signal in accordance with the present invention.

It is possible, though unlikely, that two Opticom TM signals having the same repetition rate will overlap such that the discrimination algorithm shown in FIG. 5 will not be able to differentiate between the two signals. In such a situation, the discrimination algorithm would recognize the two signals as a single Opticom TM signal. It is likely that two overlapping signals would corrupt each other and the discrimination algorithm would not be able to extract any variable data from the combined signal.

In one embodiment, Opticom TM emitters constructed in accordance with the present invention are provided with a coincidence avoidance mechanism to prevent two signals from overlapping. The coincidence avoidance mechanism consists of slightly altering the timing of the light pulses emitted by an optical emitter such that overlapping signals being transmitted by two emitters will tend to diverge. The alteration of the timing varies from emitter to emitter.

The module 50 of FIG. 4 will identify a signal from an Opticom TM source if the signal is within a minimum window time interval of 75 microseconds of the expected Opticom TM timing, thereby leaving a margin of error of 25 microseconds. In another embodiment, the window time interval is 350 microseconds to accommodate prior Opticom TM emitters, which leaves a very large margin of error to support the coincidence avoidance mechanism. Additionally, the module 50 only measures the time between sequential pulses, so the small error introduced by the coincidence avoidance mechanism will not accumulate into a larger error.

In one embodiment, the coincidence avoidance mechanism is provided by dividing the repetition rate into a variable component and a predetermined constant component. The variable component varies from emitter to emitter and the predetermined constant component does not vary from emitter to emitter.

The variable component can be determined by any convenient means that provides a high probability that the variable component will vary from emitter to emitter. In one embodiment, it has been found that contents of the physical memory which comprises the RAM portion of memory 114 varies from power-up to power-up. In this embodiment, when emitter 108 in FIG. 10 is turned on an eight-bit checksum is performed by the emitter microprocessor 112 on the initial state of the RAM portion memory 114. The emitter microprocessor 112 then performs an exclusive-or of the eight-bit checksum and the data provided by user input 110. Because user input 110 will most likely be configured for an identification code, the data provided by user input 110 will most likely be different for each Opticom TM emitter operating within the same municipality.

Six bits of the result of the exclusive-or function are retained to provide a six-bit signed integer. A random number between −48 and 48 is provided by multiplying the six-bit signed integer by a conversion factor of 1.5, resulting in a variable component between −48 and 48 microseconds.

When the variable component is added to the predetermined constant component, the emitter 108 will emit a stream of light pulses having a repetition rate that will almost certainly vary slightly from the repetition rates of other emitters. Because the emitter 108 will have a repetition rate that varies from other emitters, overlapping optical transmissions will tend to diverge. However, the stream of light pulses emitted by the emitter 108 will still be accurately received by phase selectors constructed in accordance with the present invention and prior Opticom TM phase selectors because the repetition rate will provide pulses that are well within the window time interval.

In another embodiment of the present invention, a random shift is inserted at certain points in the stream of light pulses. In this embodiment, a pseudo-random number representing a random shift is generated by the emitter microprocessor 112 and is inserted at non-critical points in the stream of light pulses, such as at the end of each data packet.

In one embodiment, the random shift can assume any value between −1 millisecond and 1 millisecond. By having two Opticom TM emitters transmitting separate streams of light pulse, with each emitter introducing a random shift after every data packet, the streams of light pulses will tend to diverge and the algorithm of FIG. 5 will be able to track the two emitters separately.

The present invention provides a vast improvement over the prior art by utilizing a transmission format capable of transmitting variable data while simultaneously maintaining signal format compatibility with prior Opticom TM systems. By encoding variable data into the stream of light pulses, a phase selector can uniquely identify an optical emitter. A phase selector that uniquely identifies an emitter can be configured to provide processed confirmation of an authorized emitter and logging of relevant data such as the identification code, the time of the preemption request, the direction of the preemption request, the duration of the preemption request and confirmation of passage of a requesting vehicle within a predetermined range of a detector.

The present invention provides new opportunities for improving mass transit efficiency. A traffic signal offset provides a mass transit vehicle with an advantage when moving through congested areas. In one embodiment, the offset is constant and provides a predictable advantage which allows a mass transit vehicle to serve a larger route. In another embodiment, the offset is variable and can be used to keep the mass transit vehicle on schedule by basing the magnitude of the offset on the lateness of the mass transit vehicle.

The present invention provides new opportunities for remotely controlling traffic intersections. An emitter having a user input device such as a keypad, joystick or toggle switch can affect the phase of traffic signal lights at in intersection by encoding phase requests selected by an authorized user into an optical signal. In response to the optical signal, a phase selector issues the selected phase requests to a traffic signal controller. The traffic signal controller will likely cause the traffic signal lights to assume the phases selected. This embodiment of the present invention is especially useful in situations requiring manual traffic control, such as funerals, parades or athletic events.

The present invention provides new options for remotely configuring optical traffic preemption systems. In one embodiment, a range of an Opticom TM is set by a maintenance worker positioning an optical emitter at the desired range and transmitting a range setting code. The phase selector determines an amplitude from the transmitted pulses and uses this amplitude as a threshold to which future optical transmissions will be compared.

Prior Opticom TM emitters required a maintenance worker to perform a tedious manual procedure.

The present invention defines new transmission and discrimination algorithms. Emitters constructed in accordance with the present invention are provided with a transmission algorithm that has a coincidence avoidance mechanism which allows overlapping pulse streams originating from different emitters to drift apart. Phase selectors constructed in accordance with the present invention are provided with a discrimination algorithm that can track optical signals from several separate optical emitters concurrently, while extracting data from each optical signal.

Although the present invention has been described with reference to preferred embodiments, workers skilled in the art will recognize that changes may be made in form and detail without departing from the spirit and scope of the invention.

What is claimed is:

1. A method of optically transmitting data comprising:
- emitting a stream of light pulses which include priority pulses occurring at a repetition rate and data pulses interleaved with the priority pulses, wherein each light pulse is separated from an adjoining light pulse by one of n predetermined time intervals;
- receiving the stream of light pulses;
- producing a received signal that represents the stream of light pulses;
- identifying received light pulses that are separated from one another by one of the n predetermined time intervals;
- sorting data pulses from priority pulses based on the predetermined time intervals separating identified light pulses; and
- assembling data derived from the priority pulses, the data pulses and the predetermined time intervals.

2. The method of claim 1 and further comprising selecting a repetition rate before emitting the stream of light pulses.

3. The method of claim 2 wherein selecting a repetition rate comprises:
- selecting a variable component of the repetition rate; and
- adding the variable component of the repetition rate to a predetermined constant component of the repetition rate.

4. The method of claim 3 wherein the predetermined constant component of the repetition rate is 9.639 Hz.

5. The method of claim 3 wherein the predetermined constant component of the repetition rate 14.035 Hz.

6. The method of claim 3 wherein the variable component of the repetition rate is between −48 and 48 microseconds.

7. The method of claim 3 wherein selecting a variable component of the repetition rate comprises generating a random number.

8. The method of claim 7 wherein generating a random number comprises:
- determining a checksum of an initial state of a memory; ·
- determining an exclusive-or of the checksum and data obtained from an input;
- providing a signed integer by retaining bits of the exclusive-or; and
- providing a random number by multiplying the signed integer by a conversion factor, wherein the random number comprises the variable component of the repetition rate.

9. The method of claim wherein emitting a stream of light pulses includes:
- representing a first logic state by emitting a data pulse between consecutive priority pulses; and
- representing a second logic state by not emitting a data pulse at a predetermined point between consecutive priority pulses.

10. The method of claim 9 wherein emitting a stream of light pulses includes arranging the data pulses into a data packet.

11. The method of claim 10 wherein emitting a stream of light pulses includes injecting a time shift into the stream of light pulses after each data packet.

12. The method of claim 11 wherein injecting a time shift includes selecting a time shift by generating a random number.

13. The method of claim 12 wherein the random is between −1 and 1 milliseconds.

14. The method of claim 10 wherein arranging the data pulses into a data packet comprises:
- defining a framing segment comprising i consecutive first or second logic states;
- defining a start segment comprising j consecutive first or second logic states; and
- defining a data segment comprising k consecutive variable logic states, wherein each variable logic state is one of the first or second logic states.

15. The method of claim 14 wherein i is equal to or greater than k.

16. The method of claim 9 wherein emitting a stream of light pulses includes evenly spacing each data pulse between a pair of consecutive priority pulses.

17. The method of claim 16 wherein n, which represents the number of predetermined intervals, is two, a first predetermined time interval is equal to a period of time separating two sequential priority pulses, a second predetermined time interval is equal to one-half the first predetermined time interval, and sorting data pulses from priority pulses and assembling data comprises:
- setting a half-bit field if the half-bit field is clear and a pulse is separated from a prior pulse by the second predetermined time interval;
- incrementing a priority pulse count field, clearing the half-bit field and storing a second logic state in a memory array if the half-bit field is set and a pulse is separated from a prior pulse by the second predetermined time interval; and
- incrementing the priority pulse count field, clearing the half-bit field and storing a first logic state in the memory array if a pulse is separated from a prior pulse by the first predetermined time interval.

18. The method of claim 1 wherein identifying received light pulses comprises:
- assigning a time stamp to each pulse represented in the received signal;
- storing the time stamp of each pulse in a memory array;
- finding pulses separated from one another by one of the n predetermined time intervals by examining time stamps stored in the memory array and comparing time intervals represented by pairs of time stamps with the predetermined time intervals;
- assigning a tag to each pulse separated from a prior pulse by one of the n predetermined time intervals, wherein equivalent tags tend to identify light pulses originating from a common source; and determining a priority level of pulses having equivalent tags based on which of the predetermined time intervals separating pulses having equivalent tags.

19. The method of claim 18 wherein two pulses are considered to be separated from one another by one of the n predetermined time intervals if a magnitude of a difference between a time interval represented by the two pulses' respective time stamps and one of the n predetermined time intervals is less than a window time interval.

20. The method of claim 1 wherein assembling data comprises:

determining a priority level;

counting priority pulses;

storing data pulses in a memory array;

determining an amplitude of each received pulse; and determining if a complete data packet has been received by scanning the memory array.

21. The method of claim 20 and further comprising:

providing a detection indication, the priority level and the amplitude of a pulse when a first number of priority pulses have been received; and providing the data packet, the detection indication, the priority level and the amplitude of a pulse when a complete data packet has been received.

22. An optical data communication system for use in a traffic signal control system having a traffic signal controller for controlling traffic signal lights that control traffic flow at a traffic intersection, the traffic signal controller being responsive to phase requests, the optical data communication system comprising:

an emitter for transmitting a stream of light pulses which represent a transmitted signal that includes a preemption request and an identification code that uniquely identifies the emitter;

a detector for receiving the stream of light pulses and producing a received signal representing the stream of light pulses; and a phase selector for receiving the received signal from the detector and extracting the preemption request and the identification code from the received signal and issuing a phase request to the traffic signal controller.

23. The optical data communication system of claim 22 wherein the phase selector includes:

data storage means for storing a list of authorized identification codes;

means for comparing the identification code extracted from the received signal with the authorized identification codes stored in the data storage means; and means for issuing a phase request only if the identification code extracted from the received signal matches one of the authorized identification codes stored in the data storage means.

24. The optical data communication system of claim 22 wherein the phase selector includes:

data storage means; and means for writing information to the data storage means in response to receiving a received signal from the detector.

25. The optical data communication system of claim 24 wherein the phase selector includes:

means for writing the identification code extracted from the received signal to the data storage means whenever the phase selector issues a phase request based on the received signal.

26. The optical data communication system of claim 24 wherein the phase selector includes:

a real time clock; and means for writing a time stamp from the real time clock to the data storage means in response to receiving a received signal from the detector.

27. The optical data communication system of claim 24 wherein the phase selector includes:

timing means for determining a duration of the preemption request; and means for writing the duration to the data storage means.

28. The optical data communication system of claim 24 and further comprising:

at least one additional detector;

a plurality of phase selector channels included within the phase selector, with each phase selector channel identified by a channel number and coupled to at least one detector; and means for writing the channel number of the channel that received the stream of light pulses to the data storage means.

29. An optical data communication system for use in a traffic signal control system that has a traffic signal controller for controlling traffic signal lights which control traffic flow at a traffic intersection, the traffic signal controller being responsive to phase requests to assume at least one of m phases, the optical data communication system comprising:

an emitter for transmitting a stream of light pulses which represent a transmitted signal that includes an offset code;

a plurality of detectors, each detector for producing a received signal representing the stream of light pulses and stationed to receive the stream of light pulses from an approach to the intersection;

a phase selector having a plurality of phase selector channels, with each phase selector channel having a channel number and coupled to at least one detector, the phase selector for receiving the received signals from the plurality of detectors, extracting offset codes from the received signals and alternately issuing phase requests to and withdrawing phase requests from the traffic signal controller based upon an offset code extracted from one of the received signals and the channel number of the phase selector channel which is coupled to the detector that received the stream of light pulses representing the transmitted signal that included the offset code.

30. The optical data communication system of claim 29 wherein the phase selector includes:

means for creating an offset with respect to a normal traffic signal sequence, with the offset tending to provide a green signal to one approach of the intersection a higher percentage of time than would the normal traffic signal sequence.

31. The optical data communication system of claim 30 wherein the emitter includes:

means for selecting a magnitude of the offset; and means for representing the magnitude in the offset code.

32. The optical data communication system of claim 31 wherein the phase selector includes:

means for issuing phase requests to create an offset having the magnitude included in the operation code.

33. An optical data communication system for use in a traffic signal control system that has a traffic signal controller for controlling traffic signal lights which control traffic flow at a traffic intersection, the traffic signal controller being responsive to a phase request to assume at least one of m phases, the optical data communication system comprising:

an emitter for transmitting a stream of light pulses which represent a transmitted signal that includes an operation code;

a plurality of detectors, each detector for producing a received signal representing the stream of light pulses and stationed to receive the stream of light pulses from an approach to the intersection;

a phase selector having a plurality of phase selector channels, with each phase selector channel coupled to at least one detector, the phase selector for receiving the received signals from the plurality of detectors, extracting operation codes from the received signals and issuing a phase request to the traffic signal controller to assume at least one of the m phases based upon an operation code extracted from one of the received signals and irrespective of the detector that received the stream of light pulses representing the transmitted signal that included the operation code.

34. The optical data communication system of claim 33 wherein the emitter includes:

means for selecting at least one of the m phases; and means for representing at least one of the m phases in the operation code.

35. The optical data communication system of claim 34 wherein the phase selector includes:

means for issuing a phase request for the phase represented in the operation code.

36. An optical data communication system for use in a traffic signal control system, the optical data communication system comprising:

an emitter for transmitting a stream of light pulses which represent a transmitted signal that includes a range setting code;

a detector for receiving the stream of light pulses and producing a received signal representing the stream of light pulses;

a phase selector for receiving the received signal from the detector, extracting the range setting code from the received signal and responding to the range setting code by determining an amplitude based on the received signal and using the amplitude as a threshold to which future received signals will be compared, wherein future received signals having an amplitude exceeding the threshold will be acted upon and future received signals having an amplitude less than the threshold, and not including the range setting code, will not be acted upon.

37. A method of optically preempting a normal sequence of traffic signal lights comprising:

emitting a stream of light pulses which include priority pulses occurring at a repetition rate and data pulses interleaved with the priority pulses, wherein each light pulse is separated from an adjoining light pulse by one of n predetermined time intervals;

receiving the stream of light pulses;

producing a signal that represents the stream of light pulses;

identifying received light pulses that are separated from one another by one of the n predetermined time intervals;

sorting data pulses from priority pulses based on the predetermined time intervals separating identified light pulses;

assembling data derived from the priority pulses, the data pulses and the predetermined time intervals;

issuing phase requests based on the data;

evaluating phase requests; and controlling traffic signal lights to assume phases based on issued phase requests.

38. A method for uniquely identifying an emitter in a traffic signal control system comprising:

transmitting a stream of light pulses which represent a transmitted signal that includes a preemption request and an identification code that uniquely identifies the emitter;

receiving the stream of light pulses and producing a received signal representing the stream of light pulses;

extracting the preemption request and the identification code from the received signal; and controlling traffic flow at a traffic intersection by issuing a phase request based upon the received signal and evaluating phase requests to determine whether the phase requests should be granted.

39. The method of claim 38 wherein controlling traffic flow includes:

storing a list of authorized identification codes;

comparing the identification code extracted from the received signal with the authorized identification codes; and issuing a phase request only if the identification code extracted from the stream of light pulses matches one of the authorized identification codes.

40. The method of claim 38 wherein extracting the identification code and the preemption request includes:

storing the identification code extracted from the received signal.

41. The method of claim 38 wherein extracting the identification code and the preemption request includes:

storing a time stamp whenever a phase request is issued.

42. A method for issuing phase requests in a traffic signal control system comprising:

transmitting a stream of light pulses which represent a transmitted signal that includes an operation code;

producing a plurality of received signals, wherein each received signal is identified by a channel number and represents light pulses received from an approach to an intersection;

receiving a received signal that represents the stream of light pulses and extracting the operation code from the received signal; and issuing a phase request to a traffic signal controller to assume at least one of m phases based upon the operation code extracted from the received signal and irrespective of the channel number associated with the received signal.

43. The method of claim 42 wherein transmitting the stream of light pulses includes:

selecting at least one of the m phases; and representing the selected phase in the operation code.

44. A method of setting a range in an optical traffic preemption system comprising:

transmitting a stream of light pulses which represent a transmitted signal that includes a range setting code;

receiving the stream of light pulses and producing a received signal representing the stream of light pulses;

extracting the range setting code from the received signal; and responding to the range setting code by determining an amplitude based on the received signal and using the amplitude as a threshold to which future received signals will be compared, wherein future received signals having an amplitude exceeding the threshold will be acted upon and future received signal having an amplitude less than the threshold, and not including a range setting code, will not be acted upon.

* * * * *